(12) United States Patent
Alon

(10) Patent No.: US 6,225,942 B1
(45) Date of Patent: May 1, 2001

(54) REGISTRATION METHOD FOR MULTIPLE SENSOR RADAR

(75) Inventor: Yair Alon, Thousand Oaks, CA (US)

(73) Assignee: Litton Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/365,307

(22) Filed: Jul. 30, 1999

(51) Int. Cl.$^7$ ..................................................... G01S 13/66
(52) U.S. Cl. ............................................................. 342/59
(58) Field of Search .................................. 342/59, 36, 29

(56) References Cited

U.S. PATENT DOCUMENTS

| | | |
|---|---|---|
| 3,218,640 | 11/1965 | Kindle et al. . |
| 3,995,269 | 11/1976 | Schumacher . |
| 4,564,839 | 1/1986 | Powell .............................. 343/5 CM |
| 4,751,511 | 6/1988 | Komata et al. ......................... 342/59 |
| 5,138,321 | 8/1992 | Hammer .................................. 342/36 |
| 5,448,243 | 9/1995 | Bethke et al. .......................... 342/59 |
| 5,451,960 | 9/1995 | Kastella et al. ........................ 342/59 |
| 5,495,540 | 2/1996 | Frankot et al. ........................ 382/294 |
| 5,606,324 | 2/1997 | Justice et al. ........................... 342/62 |

FOREIGN PATENT DOCUMENTS

| | | |
|---|---|---|
| 0831410 | 3/1960 | (GB) ........................................... 40/7 |
| 0149976 | 9/1982 | (JP) .................................. G01S/7/36 |
| 0035391 | 2/1989 | (JP) ................................ G01S/13/87 |

OTHER PUBLICATIONS

Nabaa et al. "Solution to a Multisensor Tracking Problem with Sensor Registration Errors," IEEE Transactions on Aerospace and Electronic Systems, vol. 35, No. 1, pp. 354–363, Jan. 1999.*

Bar–Shalom, Editor, Registration: A Prerequisite For Multiple Sensor Tracking, Multitarget–Multisensor Tracking: Advanced Applications, Chapter 5, pp. 155–185 (1990).

Cantrell et al, "Multiple Site Radar Tracking System", IEEE International Radar Conference, pp. 348–354, (Apr. 1980).

Fischer et al, Registration Errors in a Netted Air Surveillance System, Massachusetts Institute of Technology, Lincoln Laboratory, pp. 1–77 (Sep. 1980).

G.C. Parkinson, Radar Registration in the North Warning System, thesis submitted to Royal Military College of Canada, pp. 1–112, (1996).

* cited by examiner

Primary Examiner—Ian J. Lobo
(74) Attorney, Agent, or Firm—Koppel & Jacobs

(57) ABSTRACT

The invention is a method for radar registration by determining initially unknown azimuth and range biases (errors) in a system of multiple, overlapping coverage radars. Track data from multiple radar systems corresponding to a common target are associated into track pairs. Track pair data is then used to calculate state vectors in a multi-dimensional vector space (preferably six-dimensional), with state vector components corresponding to both position and velocity information. From these state vectors an average normalized statistical distance is calculated, where the averaging is over multiple track pairs. An azimuthal bias parameter (and preferably also a range bias parameter) are then varied to minimize the average normalized statistical distance, thereby finding the best estimates of the corrections required to register the multiple radars.

14 Claims, 7 Drawing Sheets

REGISTRATION METHOD FOR MULTIPLE SENSOR RADAR

This invention was made with government support under a contract awarded by the United States Air Force. The government has certain rights in the invention.

BACKGROUND OF THE INVENTION

1. Field of the Invention

This invention relates to radar systems generally and more specifically to the registration of multiple sensor radar systems with overlapping coverage from sensors at multiple locations.

2. Description of the Related Art

Modern radar systems often employ multiple sensors with overlapping coverage regions, forming a multiple radar network. Properly relating the data received from such multiple radars in a network poses numerous problems, particularly when two or more individual radars report a common target. In such systems it is crucial to correctly and accurately register the multiple radars to a common reference system. Such registration is generally necessary as a preliminary to other data fusion or processing.

When a single radar is reporting a target, the accuracy of this report is affected by radar registration errors. Assuming that the radar antenna's location is accurately measured and known (for example, by global positional system or "GPS"), the principal errors in registration are antenna azimuth pointing error (azimuthal error) and target zero time error (also called "target range error"). These errors (also called "bias") result (respectively) from (a) an error in the angle of the radar relative to an absolute reference (typically true North), and (b) an error in the measured range from the target to the antenna. Provided that such errors are relatively constant, they can often be tolerated in a single radar system.

In a multiple radar system, however, azimuthal and target range errors are more troublesome, as they usually prevent the multiple radars from being accurately registered with one another (and with any absolute reference frame). This is most noticeable when targets observed by more than one radar are reported to a common center and are displayed on a single radar screen. In the presence of mis-registration among the individual radars, observed targets will appear as a cluster or cloud of targets moving at the same speed and heading in the same direction. This makes the display difficult to read and interpret, much like a slide show projected from several misaligned projectors onto a common screen.

To solve this problem, computer executable registration methods which attempt to register the radars to a common reference have been developed. These previous methods generally use radar plot reports which contain only two parameters: target x and y positions in stereographic coordinates. In a simple registration method, this position data is used to adjust all the radars in the net to a master radar, which is well calibrated and serves as a reference. This process requires a significant number of target reports organized in a specific order to decouple the azimuthal and target range errors. In a low target density area or when the reference is not properly calibrated, this registration method may not perform successfully. This simple method is also limited in application because a well calibrated master radar may not always be available.

Three more sophisticated methods of registration have been considered by Fischer, Muehe and Cameron, "Registration Errors in a Netted Air Surveillance System," MIT Lincoln Laboratory Technical Note 1980-40 (Sept. 1980). The same three methods are summarized and reconsidered in Chapter 5 of Y. Bar-Shalom, *Multitarget-Multisensor Tracking: Advanced Applications.* (Artech House, 1990) pages 155–185.

The first of the three methods, that favored by Bar-Shalom, involves a generalized linear least-squares estimation technique (GLSE). This method requires the inversion of a 4×4 matrix (for a two-dimensional radar display) and would require inversion of a 6×6 matrix if extended to three dimensions (not considered by Bar-Shalom). The inverse of such a matrix can be computed, but it is not a trivial computation. To perform adequately, this method requires in the neighborhood of 50–100 data point pairs, which may not be available in every real world application. This makes this method poorly suited to low density target areas. It is also somewhat sensitive to target/sensor geometry.

A second method considered by Fisher et al. is a grid search method. This method is rejected by that author because it converges very slowly, particularly when the bias parameters (range and azimuth errors) are not completely independent.

The third method considered by Fisher ("Powell's method" in Fisher's nomenclature) uses steepest descent approach and is somewhat computationally demanding. The computations require nested loops, leading to a requirement of many iterations to arrive at a solution. This method also requires many point pairs for adequate performance, and performs poorly in low target density areas.

All of the aforementioned methods have been implemented only in two dimensions, with a modified flat-earth model, rather than in a three-dimensional, earth centered, earth fixed (ECEF) coordinate system.

SUMMARY OF THE INVENTION

In view of the above problems, the present invention is a novel, computer executable method for registering multiple, dispersed, netted radars which takes advantage of track report data to decouple azimuthal and range errors and provide fast, accurate registration even in low density target areas.

Target track reports from the multiple radars are communicated to a central or distributed data processing system. These reports may include (for each target) multi-dimensional position and velocity information, preferably as three spatial components (x, y, and z coordinates) and three velocity components (quantifying three directional components of target velocity). These (preferably six) components are associated into target track pairs corresponding to dual reports of a common target received from dual radars designated master and slave.

The slave target tracks from each pair are next adjusted to account for an estimated first bias parameter (preferably azimuthal bias). From each paired target track the processing system calculates a normalized state vector having coefficients representing the position and velocity components of the target track (preferably a six dimensional vector). Each coefficient is normalized with respect to a corresponding track measurement variance. For each target track pair, a normalized distance D between the two corresponding normalized state vectors is then calculated, and the first bias parameter is adjusted in a search loop to find the parameter value which minimizes the average normalized distance D (averaged over multiple track pairs). In the preferred embodiment, an additional search loop is executed, after optimizing the estimate of the first bias parameter, to further estimate a second bias parameter (preferably range bias) by finding the second parameter value which minimizes the average normalized distance D. The resulting best estimates of the bias parameters are then output for use in correcting the radar system registration, either manually or automatically.

In an automatic embodiment of the invention, the method is executed periodically by a data processor, without operator intervention. Kalman filtering is preferably used to smooth the output estimates (azimuthal and range bias estimates) and the estimates are used to automatically register a radar display.

Although some embodiments have been described above, they should be considered exemplary and no element recited should be considered essential to the present invention.

These and other features and advantages of the invention will be apparent to those skilled in the art from the following detailed description of preferred embodiments, taken together with the accompanying drawings, in which:

DETAILED DESCRIPTION OF THE INVENTION

A: Definitions

The following definitions are useful in understanding and using the new method. They are provided for convenience only, and are not intended to be limiting.

ECEF: "Earth Centered Earth Fixed", a three-dimensional coordinate system defined with its origin at the earth's center and with axes fixed with respect to the earth. As used herein, it will generally imply an orthogonal, Cartesian x,y,z coordinate system.

Normalized distance: Denoted by D, a measure of the distance between master and slave state vectors in a (preferably six dimensional) vector space, where each coefficient is normalized relative to a corresponding variance. Specifically, this distance is defined by eqn. 1, below.

GPS: "Global positioning system," a well known system for determining terrestrial location (latitude and longitude) by reference to satellite borne radio beacons.

RRC: "Radar referenced coordinates", a coordinate system defined in relation to a specific local radar antenna.

SRT: "Single radar tracker", an individual radar with tracking capability.

Target Pair: two reports by different radars corresponding to the same single target.

Track report: radar target tracking information containing information about an individual target. This information is preferably given as multiple data records, each including a six-state vector (including three position coordinates, three velocity coordinates) and an associated time.

Target bias error: includes two types of error—azimuthal bias and range bias. The component of total measurement error for a given target attributable to a difference between the assumed azimuthal orientation of a radar and the actual azimuthal orientation (in the case of the azimuthal bias) or a consistent offset between the reported target range and the actual range (in the case of range bias).

B. Spatial Coordinate Systems

Figure 1:
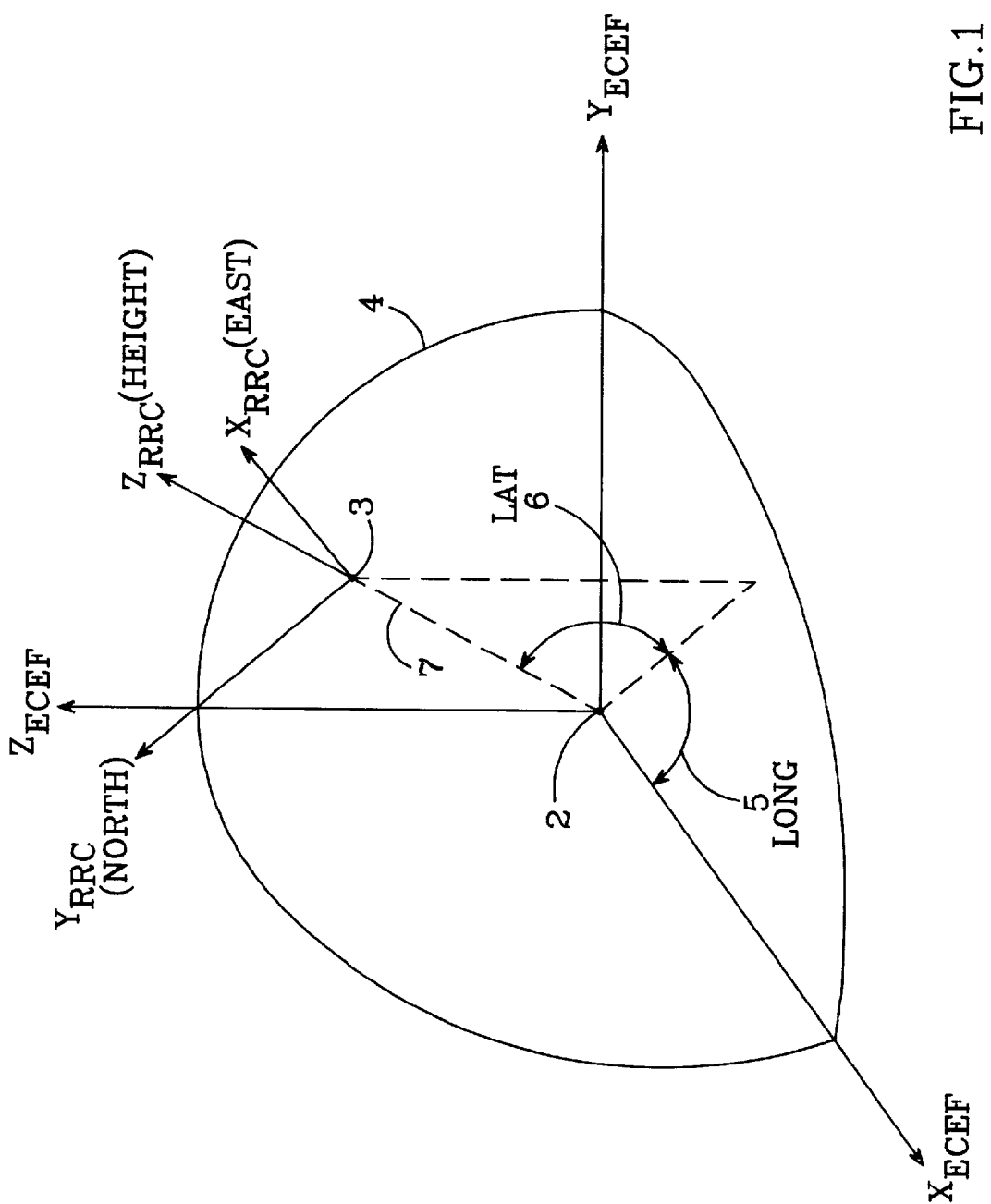
FIG. 1 is a perspective view of a section of the earth, with earth centered and radar referenced coordinate system axes shown in relation to one another.

In the discussion which follows, frequent references will occur to two differing coordinates systems: ECEF and RRC. Although both acronyms are defined above, reference to FIG. 1 will significantly help in visualizing the dual coordinate systems. This figure shows ECEF coordinate axes, centered at an origin at the earth's center 2. An individual radar antenna is located at point 3 on the surface 4 of the earth. The point 3 is located at a specific longitude 5, latitude 6 and radius 7 from the earth's center 2. The radar located at point 3 has an associated local RRC coordinate system, $X_{RRC}$, $Y_{RRC}$ and $Z_{RRC}$ as shown, with the $Y_{RRC}$ axis oriented toward true north, $X_{RRC}$ to east, and $Z_{RRC}$ radially outward from the center of the earth.

In the invention some steps are preferably performed by manipulating track data in RRC coordinates, while other steps are preferably performed with the data in ECEF coordinates, as more particularly indicated in the description which follows. Vectors in one set of coordinates can be converted into the other set according to the well known transformation:

$$\vec{X}_{ECEF} = [A]\vec{X}_{RRC} + \vec{X}_{R\_ECEF} \quad (1a)$$

$$\vec{X}_{RRC} = [A]^{-1}[\vec{X}_{ECEF} - \vec{X}_{R\_ECEF}] \quad (1b)$$

where $\vec{X}_{R\_ECEF}$ is the vector location of the radar point of origin (3 in FIG. 1) and A is the Euler matrix, given by:

$$A = \begin{bmatrix} -\sin(Long) & -\sin(Lat)\cos(Long) & \cos(Lat)\cos(Long) \\ \cos(Long) & -\sin(Lat)\sin(Long) & \cos(Lat)\sin(Long) \\ 0 & \cos(Lat) & \sin(Lat) \end{bmatrix} \quad (2)$$

where lat, long are latitude and longitude (angles), respectively. The track, radar and center earth coordinates are preferably calculated from an ellipsoidal earth model for best accuracy.

C. Environment of the Invention

Figure 2:
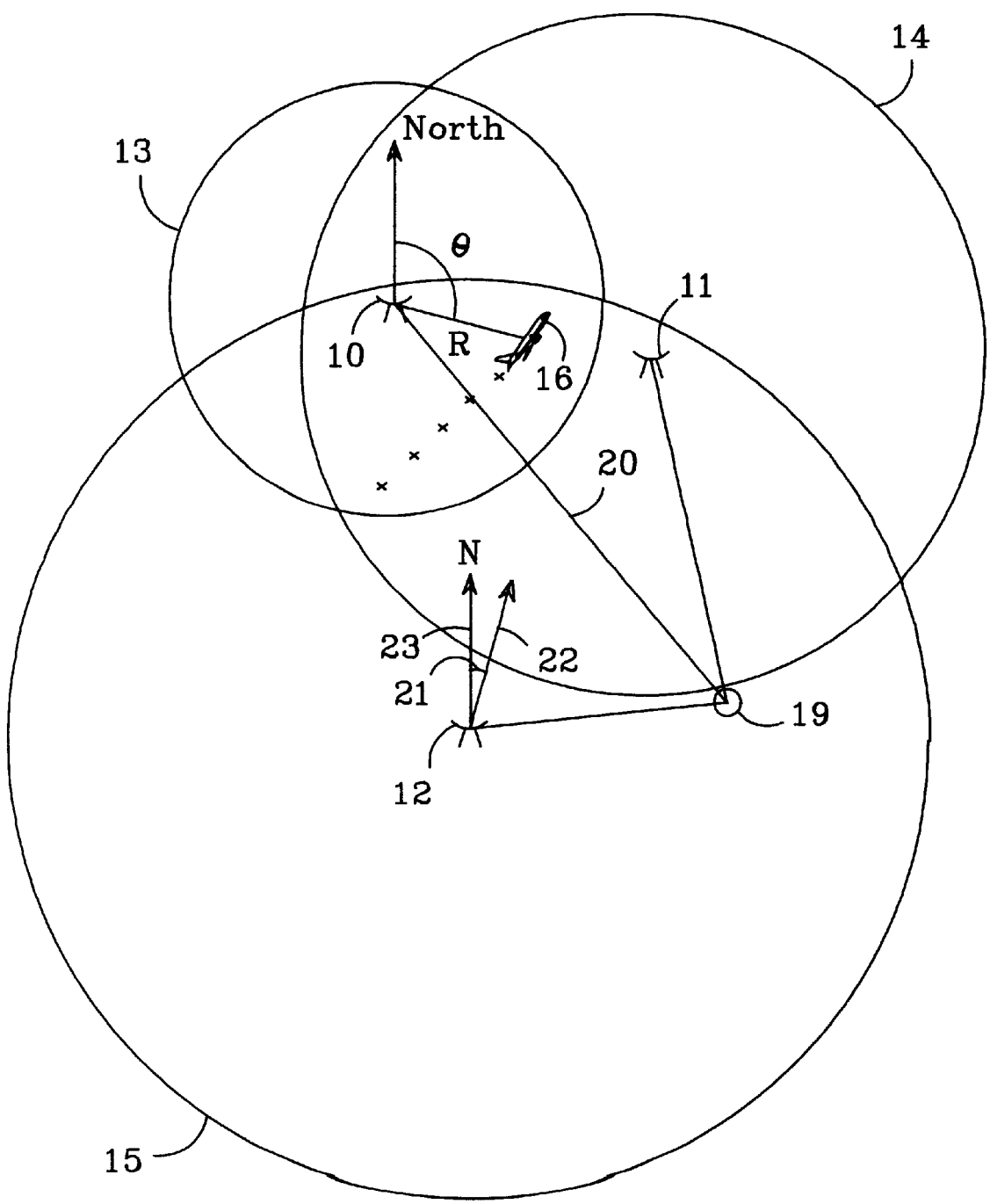
FIG. 2 is a large scale geographic map illustrating an exemplary multiple radar system which provides an environment for the invention.

The invention operates in the context of a multiple, dispersed radar network, an example of which is shown in FIG. 2. Multiple radar 10, 11 and 12 are shown with overlapping areas of coverage (indicated by circles 13, 14 and 15) which include the target 16. Although only two dimensions (x,y) are shown for clarity, in a preferred embodiment three-dimensional information (x,y,z) would be available. It should also be understood that a much larger number of radar and targets would be included in a typical application.

In the example shown in FIG. 2, the radar 10 tracks target 16, measuring at discrete times its position in polar coordinates defined by azimuth θ and range R (and preferably also an elevation angle not shown). It is assumed that the geographic positions of the radar are known. We further assume that each Single Radar Track (SRT) computes the targets' positions and velocities in RRC coordinates and communicates these "track reports" to one or more data processors 19 which have sufficient computational powers to execute the present method as described below. The data processors 19 might be at a single location as shown in the figure, with wired or wireless communication links 20 to individual SRTs. Alternatively, a plurality of data processors might be at variously located, with or without distributed allocation of processing, at the same or different locations from the SRTs.

The data processors 19 execute the registration method of the invention and output the results for use at a radar display, which may be located either at the data processor or elsewhere. To relate track reports from one radar to those from another, at least relative azimuth and range biases must be assumed. Radar 10 is shown with zero azimuthal bias, correctly aligned to true North. For radar 12, the figure shows an assumed offset angle or "azimuthal bias" 21 which is the difference between the assumed azimuthal zero point 22 and the actual absolute zero axis 23 (in the example, true North). Similarly, a range bias is assumed. These slight biases will generally be present in spite of efforts to initially calibrate the radars. The invention produces highly accurate estimates of these biases, which can then be used to adjust the radars into more accurate registration.

The method will operate successfully even when all of the individual radars are misaligned, provided that the positions of the radars are available and accurate.

D. Method Steps

Figure 3:
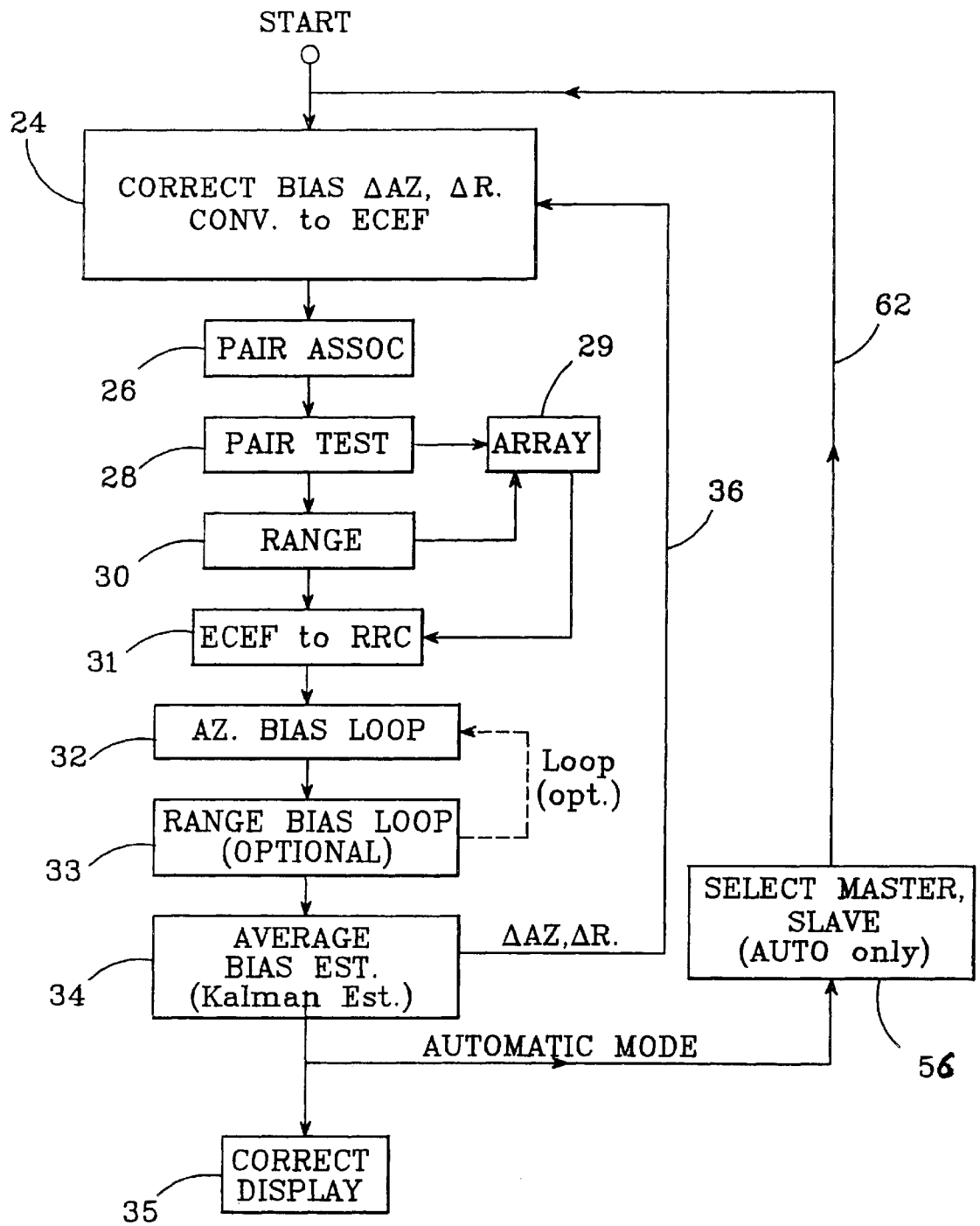
FIG. 3 is a summary flow chart of the method of the invention.

A summary view of the new method, as diagramed in FIG. 3, begins with multiple radar track, reports as inputs, obtained from multiple SRTs, located at different known locations. The multiple track reports are converted (step 24) into ECEF coordinates, preferably by converting from polar coordinates (measured for each target by the SRTs) into RRC, then applying the Euler transformations given above. In converting from polar coordinates an initial estimate of azimuthal and range biases (which could be zero) is preferably included in the calculation. This transformation step 24 could be executed by each SRT (for its own reports) or by the data processor 19 (for all reports).

The resulting multiple track reports (in ECEF coordinates) are evaluated for computability and validity by a pair association function 26, which correlates tracks to provisionally associate certain tracks into target pairs. A pair test module 28 then selects the optimum track pairs for registration. All pairs that meet the registration pair criteria (described below, in connection with FIG. 4) are stored in a pairs ECEF array 29 for further processing. When the ECEF array 29 contains at least N track pairs (N is a system defined value) a Slave to Master range function 30 is activated. This function 30 calculates an initial estimate of the average normalized distance $D_{av}$, between the N track pairs reported by "master" and "slave" radars, according to the equations:

$$D^2 = \sum_{i=0}^{N} \frac{(X_{imaster} - X_{islave})^2}{VarX_{imaster-slave}} \quad (3)$$

$$D_{AV} = \frac{\sum_{N} D^2}{N} \quad (4)$$

where $X_{master}$, $X_{islave}$ are the respective positions and velocity of the master and slave radars in ECEF coordinates, and $VarX_{imaster-slave}$ are the master-slave variances associated with each of the components of the track (discussed in greater detail in connection with FIG. 4, below)

Next, the slave portion of each track pair is converted from ECEF to RRC coordinates by an ECEF to RRC conversion function 31 and the results are stored in the RRC array 29. This con version function 31 preferably uses the Euler ECEF to RRC rotating expressions previously given (equations 1–2). The resulting RRC description of the slave track data is used by the following step, the Azimuth Bias calculation loop 32.

The Azimuth Bias calculation loop 32 is a simple search loop which attempts to minimize the pair average normalized distance, $D_{AV}$, for the target pairs. In this loop, a small azimuth offset estimate is introduced (by rotating the track state vectors in RRC coordinates) and is reiteratively varied in increments until a minimum normalized distance is found. The correction is executed on a group of N target pairs and is repeated K times to generate a better estimate of the target bias error. Preferably a range offset loop 33 is also executed, in which a range offset is also introduced and varied in increments until a minimum normalized distance $D_{av}$ is found, minimized with respect to the range offset as well as the azimuth offset. As discussed in detail below, the azimuth error loop and the range error loop can be executed independently, as the invention decouples the range bias from the azimuth bias, allowing the azimuth bias to be minimized independently, in separate consecutive loops (not nested loops).

Optionally, in order to reduce the effect of any residual coupling between range and azimuth bias, the azimuth and range loops may be executed more than once, first by executing the azimuth loop before the range loop, then in the opposite order.

After the loop(s) are executed and the optimal azimuth (and optionally, range) bias estimates are obtained, the bias estimate(s) are averaged with a previous estimate in an averaging function 34 to provide the final azimuth (and range) corrections. These corrections are preferably then applied to ongoing radar measurements and the results displayed for the user (step 35), resulting in a more accurate and readable display.

This entire process is preferably repeated as new N target pairs are received from the SRTs, and the azimuth bias is repeatedly averaged to reflect the new cumulative estimate. The repetition is accomplished by looping back, as indicated by path 36, to step 24. The azimuth bias estimate at any time is thus a weighted average of previous bias estimates. This averaging or "smoothing" can be done by a number of well known techniques, including Kalman filtering. Any new registration process will start from the previously calculated offset providing a better estimate of the bias error. This is accomplished by applying the bias corrections to the target tracks before executing the functions 24 through 35.

Further details of operation of a typical embodiment will be described with reference to the above summary beginning with the pair test module 28. The details will be discussed first in the context of a manual embodiment; an automatic embodiment incorporates the same the steps.

Figure 4:
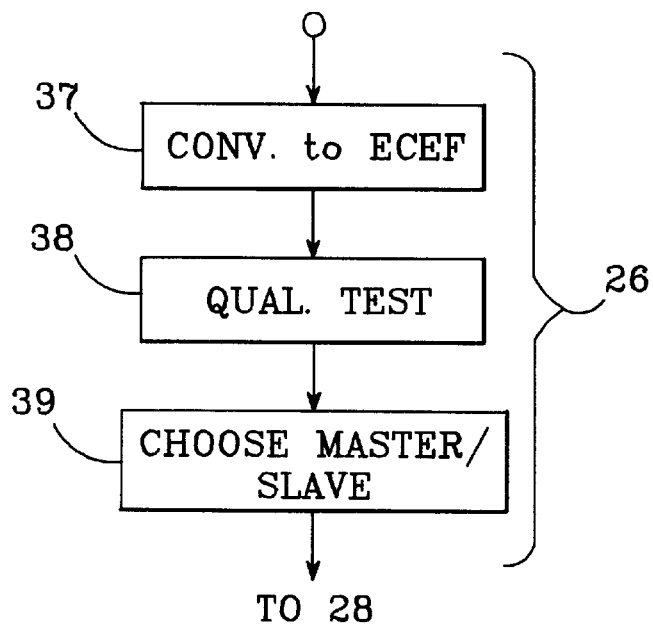
FIG. 4 is a flow chart of the pair test step of FIG. 3.

The pair test module 28 selects the pairs of tracks which are best suited for registration, preferably by using multiple tests, as shown in FIG. 4. First, multiple radar track pair candidate tracks are converted (if they have not already been converted by the SRTs) into ECEF coordinates by an ECEF conversion function 37. Next, a quality test 38 assigns a quality value γ of at least γmin, where γ is a measure of the "quality" of the track, on a pre-defined scale. The quality factor γ is preferably calculated by the SRT, based upon information specific to the individual SRT. The SRT's characteristics will vary depending on manufacturer and model, but in general smoothing filters are used to accomplish target tracking. The instantaneous values of the smoothing filter's tracking parameters are indicia of the "quality" γ of the target track. In some SRTs a time varying quality parameter γ is directly available from the SRT. In other cases, it may be necessary to calculate a tract quality parameter γ from the smoothing factors of the tracking filter, in light of the manufacturers information about the individual model SRT. γ can be established by a real-time calculation or from a look-up table, based on the individual SRT used.

Provided that a track pair passes the quality test function 38, a master/slave choice function selects tracks consistent with a master/slave status pre-assigned to individual SRT's. For most efficient registration processing, a track's distance from the master radar, $R_{master}$, should be less than its distance from the slave radar, $R_{slave}$. The function thus selects tracks for a given master/slave assignment of SRT's, based on comparison of the range from the reports, to guarantee this relative distance condition. This reduces the effect of slave radar azimuth alignment bias on the registration process. This can be best understood by considering the extreme case in which the distance of the target from the master radar is zero. The azimuth error measured in that case will be that of the slave radar only and the master radar will not contribute any azimuth error (assuming that the master radar location is well known, as for example by GPS reading). An operator selectable parameter, $K_{min}$, is used to quantify how much less $R_{master}$ must be than $R_{slave}$ for a track pair to be considered for registration processing. Only tracks with $K_{range}$ less than $K_{min}$ are used in the registration process, where $K_{range}$ is defined by:

$$K_{range} = \frac{R_{master}}{R_{slave}} < K_{min} \quad (5)$$

In a typical embodiment of the invention, the default value of $K_{min}$ is 0.8.

In order to allow more track pairs to be used in the registration process, the range ratio limitation is lifted once the radar used as master is registered. The estimated error in the registration correction is used as a flag. Once the errors in registration (in azimuth and range) are less than $\Delta Az_{REG}$, $\Delta R_{REG}$ (respectively set to 0.2 Degrees and 0.2 datamiles), all pair tracks which pass the other criteria stated below can be used for registration.

A second criterion, track density is preferably also considered in the selection of tracks for use in the registration method. When track density exceeds a predefined value, only tracks which are located between the master and the slave radar are considered for registration. This criterion can be stated as:

$$R_{slave} < K_D R_{master\_to\_slave} \quad (6)$$

where $R_{master\_to\_slave}$ is the master to slave distance, $R_{slave}$ is the track distance from the slave radar, and $K_D$ is user chosen to be less than 1. This criterion improves performance because it excludes tracks at a long distance from the slave radar. Such tracks might ordinarily be suitable for registration in low density areas, but could result in a higher number of mis-associations in a high density area.

In the event that a slave radar is a short range radar within the coverage of a longer range master radar, but having no track detections close to the master radar, an exception to the above criteria is preferably applied. In such cases all reports at a range of at least 0.5 of the slave radar range will be useable for registration.

Referring again to FIG. 3, The slave-to-master range function 30 is activated once the pairs ECEF file exceeds a predefined level N (a default value of N=4 is suitable). This function calculates an initial estimate of the average normalized distance between the track pair reported by the master and slave radars, using eqns. 3 and 4. This average distance is used when starting the registration process.

After the slave-to-master range is calculated, The ECEF to RRC function 31 converts the slave portion of each track pair to RRC coordinates and stores the result in a slave track file. The slave track data in RRC is used by the azimuth bias loop 32 to perform the radar registration.

The azimuth bias loop 32 uses a simple search loop which attempts to minimize the pair average normalized distance, $D_{av}$, for the (preferably six-dimensional) state vectors corresponding to the slave-master pairs selected for registration. It is preferable that the state vectors include three position and three velocity entries; however, the invention can be practiced on four dimensional state vectors, which include two position and two velocity entries. The method operates on state vectors which include both position and velocity information, because the method depends on the availability of both position and velocity information to decouple the azimuthal bias from the range bias. This decoupling is mathematically demonstrated below, in connection with FIG. 7.

It is noteworthy that the method of the invention is not limited to the use of any particular coordinate system, but could be executed using any multidimensional coordinate system, so long as the state vectors and preferably also their variances are available or calculable. Some exemplary coordinate systems would include, without limitation, stereographic, ECEF, or latitude and longitude coordinates.

Figure 5:
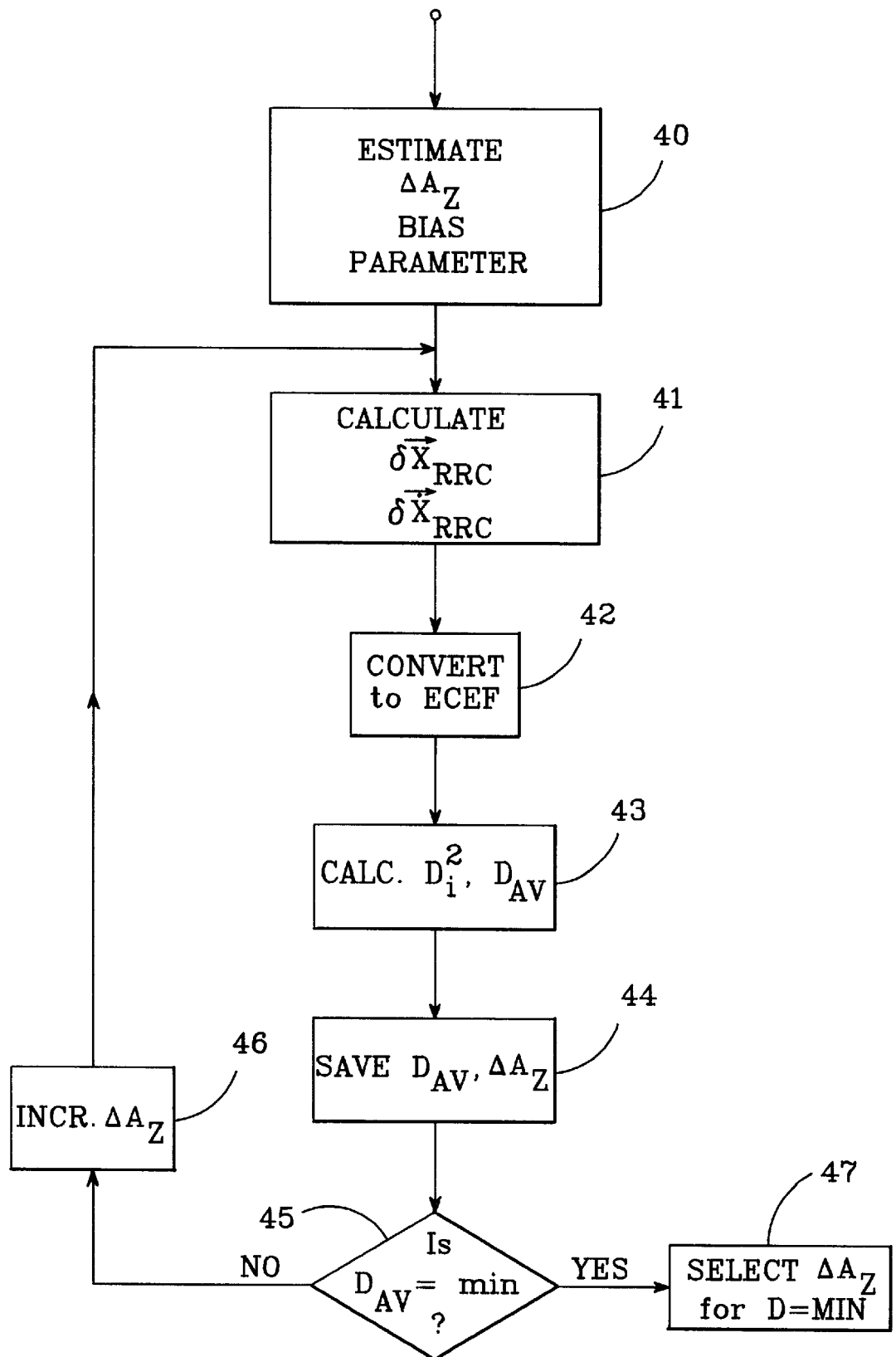
FIG. 5 is a detailed flow chart of the azimuth bias loop step of FIG. 3.

The registration method preferably includes separate azimuth and registration loops utilizing the above equations. The azimuth loop is shown in FIG. 5. First the function estimates (step 40) initial azimuth and range bias parameters $\Delta Az$ and $\Delta R$. These bias parameters are then used to calculate (step 41) RRC error vectors $\delta \vec{X}_{RRC}$ and $\delta \vec{\dot{X}}_{RRC}$ from the equations 17a and 17b given below in the discussion of FIG. 7. Once the RRC error vectors have been calculated they are converted to ECEF coordinates (step 42), which can be done by simple rotation using the Euler A conversion 25 matrix for the slave radar's longitude and latitude values, as defined above (equations 1,2).

Next the function calculates (step 43) the new distance between the slave and master track range elements by the equations:

$$\Delta X = X_{Slave} - \delta X_{ECR} - X_{Master} \quad (7a)$$

$$\Delta Y = Y_{Slave} - \delta Y_{ECR} - Y_{Master} \quad (7b)$$

$$\Delta Z = Z_{Slave} - \delta Z_{ECR} - Z_{Master} \quad (7c)$$

$$\Delta \dot{X} = \dot{X}_{Slave} - \delta \dot{X}_{ECR} - \dot{X}_{Master} \quad (7d)$$

$$\Delta \dot{Y} = \dot{Y}_{Slave} - \delta \dot{Y}_{ECR} - \dot{Y}_{Master} \quad (7e)$$

$$\Delta \dot{Z} = \dot{Z}_{Slave} - \delta \dot{Z}_{ECR} - \dot{Z}_{Master} \quad (7f)$$

and $$D^2{}_i = \frac{\Delta X_i^2}{VarX_{i_{Slave\_master}}} + \frac{\Delta Y_i^2}{VarY_{i_{Slave\_Master}}} + \frac{\Delta Z_i^2}{VarZ_{i_{Slave\_master}}} +$$

$$\frac{\Delta \dot{X}_i^2}{VarVx_{i_{Slave\_master}}} + \frac{\Delta \dot{Y}_i^2}{VarVy_{i_{Slave\_Master}}} + \frac{\Delta \dot{Z}_i^2}{VarVz_{i_{Slave\_master}}}$$

which gives the (squared) normalized distance $D_i$ of the ith track pair data points, in the coordinate system corresponding to the estimated azimuth and range errors. The average distance for all N track pairs is given by:

$$D_{av} = \frac{1}{N} \sum_N D_i^2 \qquad (8)$$

The value of $D_{av}$ and the corresponding $\Delta Az$ and $\Delta R$ are then saved, for example in an array in memory (step 44). The calculated value of $D_{av}$ is then tested for a local minimum (step 45). If a local minimum is detected, the value of $\Delta Az$ is incremented (step 46) and the method loops back to repeat steps 41 through 45 until a local minimum is detected. The program then selects from the array in memory the $\Delta Az$ which produced the local minimum normalized average distance $D_{av}$ (step 47). This $\Delta Az$ is the best estimate of the azimuth bias, based on the N track pairs chosen for consideration.

Because the track pair data includes velocity vector data, which as demonstrated below (in Section E) is decoupled effectively from range error, the azimuth loop can find a local minimum of normalized average distance which will be largely independent of range bias. Once this local minimum is found, another independent loop is preferably executed to determine the best estimate of range bias. The two loops need not be nested to find the minimum; they are preferably executed consecutively, which finds both minima with fewer iterations than would be required for nested loops. The two loops can advantageously be repeated multiple times, most preferably in alternating sequence, to remove the effects of any possible residual range/azimuthal error coupling.

Figure 6:
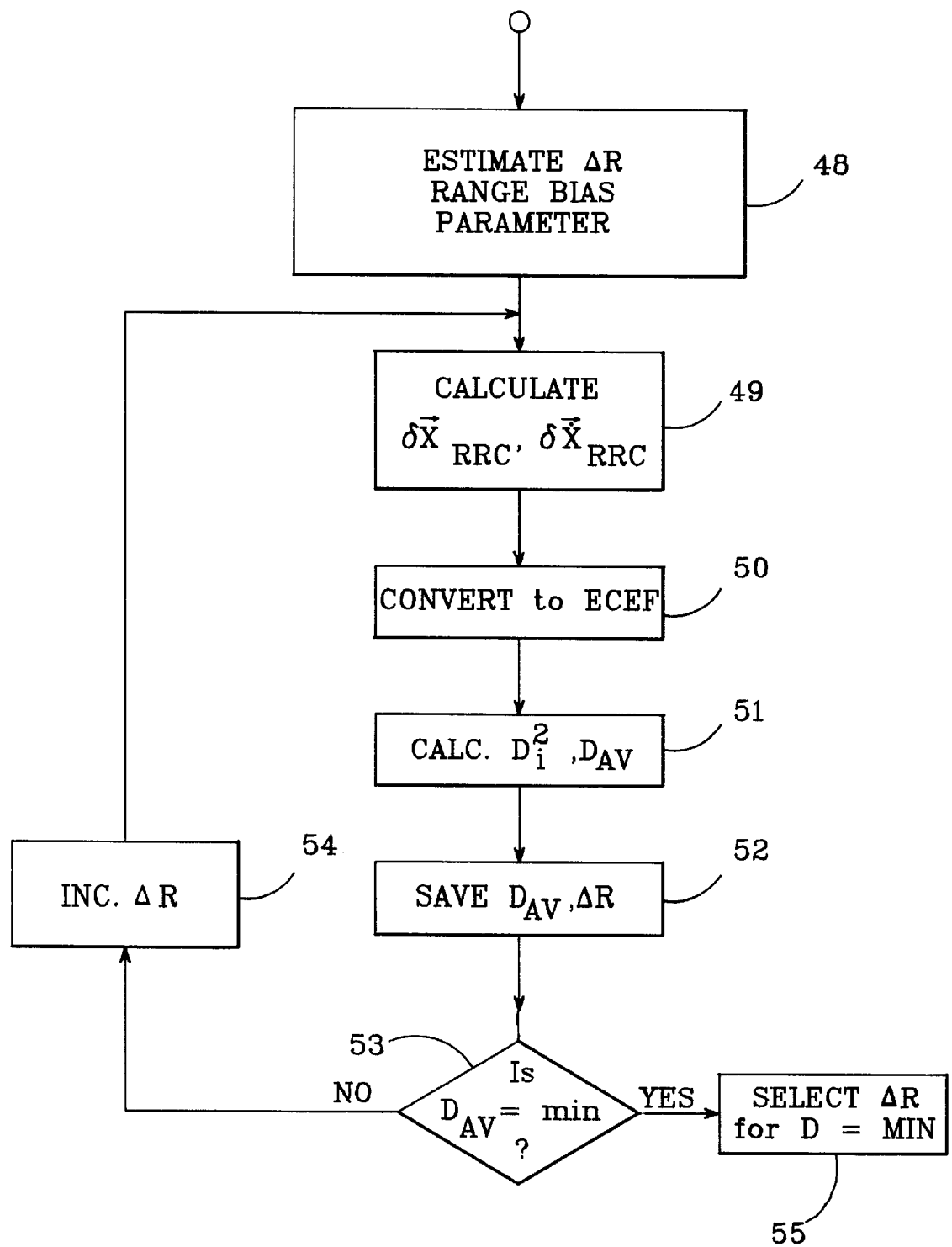
FIG. 6 is a detailed flow chart of the range bias loop step of FIG. 3.

The range bias loop, shown in FIG. 6, begins with estimating a range bias parameter $\Delta R$ (step 48). Next, error vectors $\delta \vec{X}_{RRC}$ and $\delta \dot{\vec{X}}_{RRC}$ are calculated (step 49) as described above in connection with the azimuthal bias loop. The error vectors are then converted to ECEF coordinates (step 50), $D_i^2$ and $D_{av}$ are calculated (step 51) and the results are saved (step 52). The process tests for a local minimum $D_{av}$ (step 53) and, if a minimum is not detected, the range bias parameter $\Delta R$ is incremented (step 54) and the loop repeated. When the minimum distance is reached, the function exits the loop and the range bias parameter value is selected (step 55) which produced the minimum average normalized distance $D_{av}$. This is the value of range bias which best aligns the track pairs chosen for consideration.

The azimuthal bias loop (and preferably also the range bias loop) are repeated with small increments of range and azimuth bias. In one embodiment, the direction of the azimuth error is established before entering the loop by applying bracketing azimuth steps of +/−0.2 degrees and +/−0.1 degrees. The resulting D values are calculated. Based on the direction (+/−) of improvement, the increments are set to sweep in either a + or − direction. If the $D_{av}$ associated with zero step (center) value is lower than either of the +/−0.1 steps, it is assumed that the minimum D occurs at less than 0.1 degrees from center and no correction is performed. If the bracketing indicates that the minimum D is at less than 0.2 degrees, a 0.01 degree azimuth increment/decrement is set and the loop seeks the azimuth bias with in 0.01 degree steps. If, on the other hand, one of the 0.2 steps results in the lowest D, it cannot be assumed that the minimum occurs at less than 0.02 degrees and the step increment is set to 0.02 degrees to speed up the search. This is merely one example of a possible search algorithm which can be used with the invention. Many other search algorithms are known and could be used without departing from the scope of the invention.

The azimuth bias loop is preferably repeated for each new N pairs (as track data becomes available) and the azimuth bias is repeatedly averaged to reflect the new cumulative estimate. Most preferably the range bias loop is repeated and averaged in the same manner. The averaging can be suitably performed according to the equations:

$$Az_{offsetN} = \frac{Az_{offset(N-1)}(N-1) + Az_{offset}}{N} \qquad (10a)$$

$$R_{offsetN} = \frac{R_{offset(n-1)}(N-1) + R_{offset}}{N} \qquad (10b)$$

where N in this context is the number of calculations included in the average, $Az_{offsetN}$ is the smoothed estimate of azimuth after N calculations, $Az_{offset(N-1)}$ is the previous average (after N-1 repetitions), $Az_{offset}$ is the most current unsmoothed determination of offset, and the $R_{offset}$, $R_{offset(N-1)}$ and $R_{offsetN}$ are the analogous Range values.

Alternatively, the averaging of the bias values can be performed by a Kalman estimator (discussed in more detail below in connection with an automatic embodiment).

The best estimates of azimuth and preferably also range bias are applied when the operator manually terminates the registration process. At that time, the best estimates of slave radar azimuth and range bias are reported to the system where they are stored for bias correction processing: each track report (or plot report in the actual SRT system) prior to conversion to ECR is corrected by subtracting the appropriate bias estimate to offset the error caused by radar misalignment.

Once an initial azimuth and range bias are established, the bias variance is also reduced to reflect the improved accuracy of the correlation process. In one suitable manual embodiment of the invention, a bias variance is adjusted (in the averaging function 31) to reflect the improved accuracy of the correlation process, by setting the new variance to 1/10 of the azimuthal bias estimate found by the previous iteration of the registration method. In an automatic mode embodiment of the invention, discussed below (in connection with "Automatic mode"), the variance is preferably provided by a Kalman estimator.

E. Demonstration of Azimuth/Range Decoupling

Figure 7:
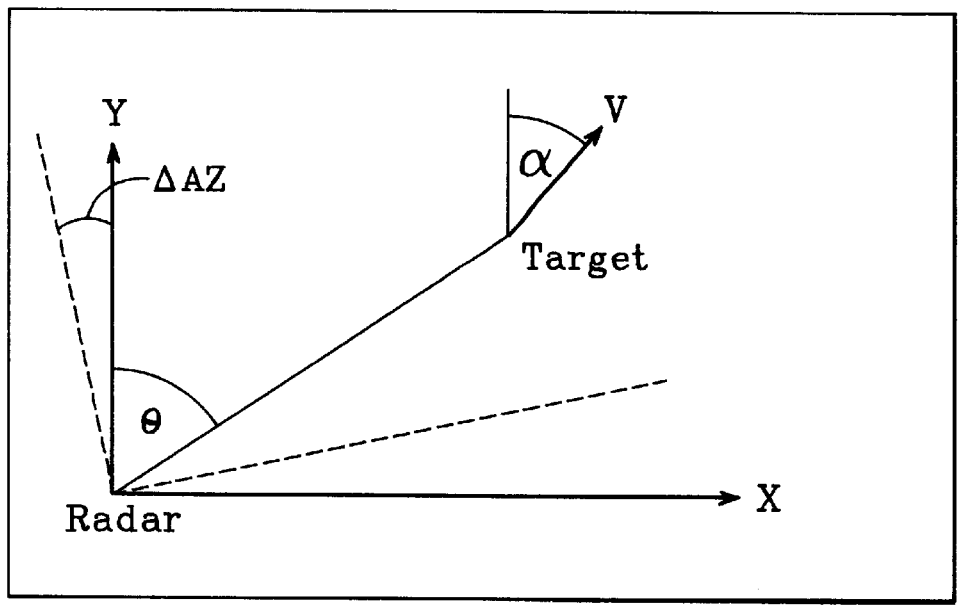
FIG. 7 is a graph showing in two (x,y) dimensions the vector relationships between target position, target velocity, and radar referenced coordinates.

Referring now to FIG. 7, the track report in RRC coordinates is given by the vector denoted $\vec{X}_{RRC}$, where:

$$\vec{X}_{RRC} = [x, y, z, \dot{x}, \dot{y}, \dot{z}]^T \qquad (11)$$

where position is given as:

$$X = R \sin \Theta \cos \Phi \qquad (12a)$$
$$Y = R \cos \Theta \cos \Phi \qquad (12b)$$
$$Z = R \sin \Theta \qquad (12c)$$

where $\Theta$ is the azimuthal angle of the target, R is the range to the target, and $\Phi$ is the elevation angle (not shown in FIG. 7). The velocity is derived from the position according to the equations:

$$\dot{X} = \dot{R}\sin\Theta\cos\Phi + \dot{\Theta}R\cos\Theta\cos\Phi - \dot{\Phi}R\sin\Theta\sin\Phi \quad (13a)$$

$$\dot{Y} = \dot{R}\cos\Theta\cos\Phi - \dot{\Theta}R\sin\Theta\cos\Phi - \dot{R}\cos\Theta\sin\Phi \quad (13b)$$

$$\dot{Z} = \dot{R}\sin\Phi + \dot{\Phi}R\cos\Phi \quad (13c)$$

These expressions can be derived from FIG. 7 using the X and Y radial velocities and the earth curvature, and the relations:

$$\dot{R} = V\cos(\alpha - \Theta) \quad (14a)$$

$$\dot{\Theta} = \frac{V}{R}\sin(\alpha - \Theta) \quad (14b)$$

$$\dot{\Phi} = \frac{V}{R_{EARTH}} \quad (14C)$$

where $R_{EARTH}$ is the earth radius (at the SRT), V is velocity of the target, and a is the angle of the target velocity vector, as shown in the figure. It follows that the RRC velocities can be expressed as:

$$\dot{X} = V\cos(\alpha - \Theta)\sin\Theta\cos\Phi + V\sin(\alpha - \Theta)\cos\Theta\cos\Phi - V\frac{R}{R_{EARTH}}\sin\Theta\sin\Phi \quad (15a)$$

$$\dot{Y} = V\cos(\alpha - \Theta)\cos\Theta\cos\Phi - V\sin(\alpha - \Theta)\sin\Theta\cos\Phi - V\frac{R}{R_{EARTH}}\cos\Theta\sin\Phi \quad (15b)$$

$$\dot{Z} = V\cos(\alpha - \Theta)\sin\Phi + V\frac{R}{R_{EARTH}}\cos\Phi \quad (15c)$$

Note that the range is divided by the earth's radius which practically eliminates the last part of each equation, resulting in an expression for velocity which depends only on angles (azimuth and, if available, elevation). By using well known trigonometric identities (for functions of sums of angles), these equations can be simplified to:

$$\dot{X} = V\sin(\alpha)\cos\Phi \quad (16a)$$

$$\dot{Y} = V\cos(\alpha)\cos\Phi \quad (16b)$$

$$\dot{Z} = V\cos(\alpha - \Theta)\sin\Phi \quad (16c)$$

where the approximation $R/R_{EARTH}=0$ has been made. A bias error in range and azimuth will result in offsets in all six states. The total offset can be formulated by calculating the effects in range and azimuth offset on the state vector which result from rotation and offset of the system coordinates.

The azimuth bias error can be calculated from the variation of Θ with offset of the state vector due to the coordinate rotation. The standard Euler conversion formula can be used, resulting in the expressions:

$$\delta \vec{X}_{\Delta Az} = \begin{bmatrix} \Delta X_{AZ} \\ \Delta Y_{AZ} \\ \Delta Z_{AZ} \end{bmatrix} = \begin{bmatrix} Y\sin(\Delta Az) + X\cos(\Delta Az) - X \\ -X\sin(\Delta Az) + Y\cos(\Delta Az) - Y \\ 0 \end{bmatrix} \quad (17a)$$

$$\delta \vec{\dot{X}}_{\Delta Az} = \begin{bmatrix} \Delta \dot{X}_{AZ} \\ \Delta \dot{Y}_{AZ} \\ \Delta \dot{Z}_{AZ} \end{bmatrix} = \begin{bmatrix} \dot{Y}\sin(\Delta Az) + \dot{X}\cos(\Delta Az) - \dot{X} \\ -\dot{X}\sin(Az) + \dot{Y}\cos(\Delta Az) - \dot{Y} \\ 0 \end{bmatrix} \quad (17b)$$

where $\delta\vec{X}_{\Delta Az}$, $\delta\vec{\dot{X}}_{RRC}$ are the vector position and velocity variations, respectively. For small azimuth correction the Cosine term can be set equal to 1. The effect of range bias error on target state vector (location and velocity) is calculated by taking the derivative of the R with respect to the range bias, ΔR:

$$\Delta X_{\Delta R} = \Delta R\sin\Theta\cos\Phi = \frac{\Delta R}{R}X \quad \Delta \dot{X}_{\Delta R} = V\frac{\Delta R}{R_{EARTH}}\sin\Theta\sin\Phi \approx 0 \quad (18a)$$

$$\Delta Y_{\Delta R} = \Delta R\cos\Theta\cos\Phi = \frac{\Delta R}{R}Y \quad \Delta \dot{Y}_{\Delta R} = V\frac{\Delta R}{R_{EARTH}}\cos\Theta\sin\Phi \approx 0 \quad (18b)$$

$$\Delta Z_{AZ} = \Delta R\sin\Phi = \frac{\Delta R}{R}Z \quad \Delta \dot{Z}_{AZ} = V\frac{\Delta R}{R_{EARTH}}\cos\Phi \approx 0 \quad (18c)$$

Note that to a close approximation none of the velocity components are affected by the range bias. The variations in position and velocity with respect to a small change in range are thus:

$$\delta\vec{X}_{\Delta R} = \begin{bmatrix} \Delta X_{\Delta R} \\ \Delta Y_{\Delta R} \\ \Delta Z_{\Delta R} \end{bmatrix} \quad \delta\vec{\dot{X}}_{\Delta R} = \begin{bmatrix} \Delta \dot{X}_{\Delta R} \\ \Delta \dot{Y}_{\Delta R} \\ \Delta \dot{Z}_{\Delta R} \end{bmatrix} \quad (19)$$

The total error in RRC coordinates, $\delta\vec{X}X_{RCR}$, can thus be expressed as the vector sum of the two vectors $\delta\vec{X}_{\Delta Az}$ and $\delta\vec{X}_{\Delta R}$. The velocity error in RRC can be similarly expressed:

$$\delta\vec{X}_{RRC} = \delta\vec{X}_{\Delta Az} + \delta\vec{X}_{\Delta R} \quad (20a)$$

$$\delta\vec{\dot{X}}_{RRC}\vec{\dot{X}}_{RRC} = \delta\vec{\dot{X}}_{\Delta Az} + \delta\vec{\dot{X}}_{\Delta R} \quad (20b)$$

These vectors are to be subtracted from the radar data to compensate for azimuth and range bias errors.

The significance of the above equations lies chiefly in the result that while the position error is coupled to the azimuth and range bias, the velocity error is affected mainly by the azimuth bias and is nearly decoupled from the range bias. Due to this decoupling, the velocity vector is very instrumental in the registration method, allowing the azimuth bias to be determined independently of even a relatively high range error.

F. Automatic Mode

1. Method steps:

The invention may be implemented in either a manual or an automatic embodiment, or as a system with switchable manual/automatic modes. The manual embodiment, discussed above, requires an operator to initiate the registration process and to terminate the process. The automatic embodiment, on the other hand, provides continuous registration of a radar net, automatically executing in the background without operator intervention.

In the automatic embodiment, radar registration is performed automatically, providing nearly continuous registration of an entire radar network. It uses the same method as the above manual embodiment, but adds automatic selection of the master/slave pairs to be used for the registration process (and preferably for Kalman filtered smoothing). In the most preferred embodiment, an operator can initiate the automatic registration at any time and it will start from the best bias estimate that was previously calculated.

In the automatic radar master/slave selection function (step 56 in FIG. 3) a control function (preferably a software module) scans through all of the radars and selects a master radar to pair with each designated slave radar. The master radar selection is preferably based on a probabilistic process in which the two top ranked master radars are selected from candidate radars. The final selection is preferably based on a cost function that assigns higher probability to the most fitted master radar. This process allows a less fitted master radar to attempt, with lower probability, to register the slave radar. This prevents locking the registration process to a single radar pair.

Figure 8:
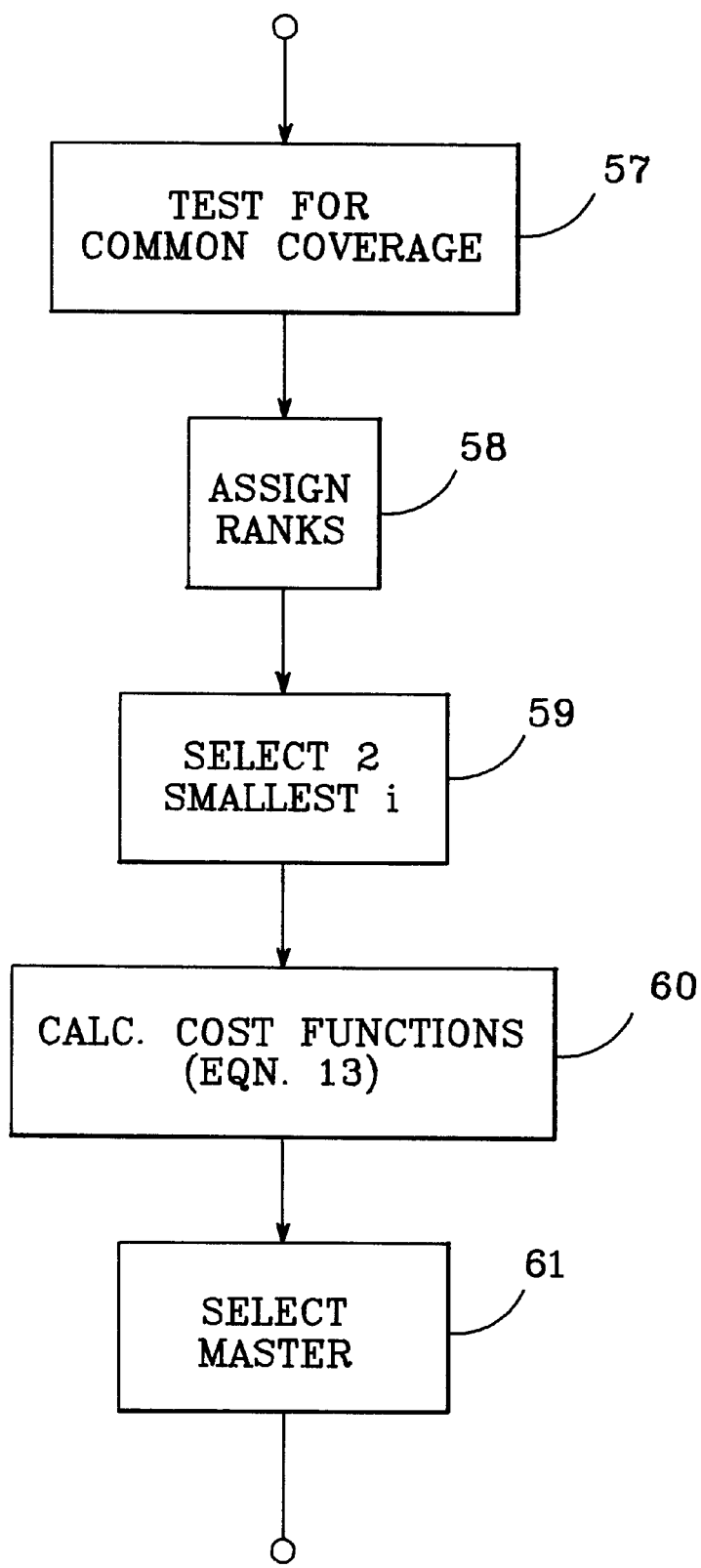
FIG. 8 is a flow chart of the detailed steps of the select master/slave step of FIG. 3, which is present in an embodiment of the invention which includes an automatic mode.

The preferred method of automatic master/slave selection is shown in FIG. 8. First, all possible master radar candidates are tested (step 57) for common coverage, which can be determined from known ranges and locations of the candidate radars. Only the candidates with at least ten per-cent common coverage with the slave radar will be further considered as candidates. The remaining candidate radars are then ranked (step 58) for best coverage using an index (i) as a measure of relative degree of common coverage, according to the equation:

$$Index(i) = \frac{R_{SlaveMaster}}{R_{maxslave(i)} + R_{maxmaster(i)}} < 1 \quad (21)$$

The two radars with the smallest indices are then selected (step 59) as the remaining candidates for master radar A cost function is then established (step 60) by evaluating the ratio of the indexes and the azimuth variance ratio for the radars. A different weighting in the cost function is issued for the initial azimuth bias recorded in the radar file. The cost function is defined by the equations:

$$\text{Cost} = (\text{Costrange}) \cdot (\text{Rangefactor}) + (\text{Cost Az}) \cdot \text{Az factor} \quad (22a)$$

where $$AzFactor_{(1)} = \frac{VarAz_{(2)}}{VarAz_{(1)} + VarAz_{(2)}} \quad (22b)$$

$$RangeFactor = \frac{Index_{(2)}^2}{Index_{(1)}^2 + Index_{(1)}^2} \quad (22c)$$

where Costrange and CostAz are user definable parameters, suitably set to 0.7 and 0.3 respectively. The candidate with the higher cost function is then weighted accordingly in selection (step 61) as the master radar.

Preferably selection is performed based on a random function, with probability of selection weighted according to the calculated cost function.

Once the master radar for each slave has been selected by the procedure of FIG. 8, the pair selections are output to the pair test function 28 and the method proceeds as in the manual embodiment (shown in FIG. 3). After the biases are determined, the method preferably loops back as shown by branch 62 and repeats. In a suitable embodiment, a new master/slave pair is automatically selected every two minutes or when the previous pair has completed eight successful registration tests (with each new test preferably based on four tracks in the master/slave coverage area). The new registration values are then used as inputs to a Kalman estimator, which provides the averaging of the bias estimates (step 34 in FIG. 3).

2. The Kalman estimator:

A Kalman filter is preferably used for the range and azimuth registration smoothing. When a new measured data point is received, the smoothed estimate is given by the equation:

$$Z^S = Z^P + S[Z^m - MZ^P] \quad (23)$$

where $Z^S$ is the new smoothed bias estimate column vector, $Z^P$ is the predicted bias estimate vector (which in the case of single stage is the previous smoothed estimate), S is the smoothing coefficient matrix, $Z^m$ is the measured column matrix, and M is the measurement matrix. The smoothing coefficient matrix, S, is calculated from the predicated registration covariance matrix and the new registration data covariance matrix, according to:

$$Z^m = MZ + N \quad (24)$$

where N is the measurement error column matrix, and $$S = P^P M^T (M P^P M^T + Q)^{-1} \quad (25)$$

where $P^P$ is the predicated covariance matrix, Q is the measured data covariance matrix, and the superscript $T$ indicates a matrix transposition. The new predicated covariance matrix $P_n^P$ is then set to the previous smoothed covariance matrix, $P_{n-1}^S$ (where n is a discrete time index).

$$P_n^P = P_{n-1}^S \quad (26)$$

where $P_{n-1}^S = (I - SM)_{n-1}^S$. The state vector and variances are thus propagated to the new time.

$$Z^P = \Phi Z^S \quad (27a)$$

$$P^P = \Phi P^S \Phi^T + P_N \quad (27b)$$

Where $\Phi$ is the time transition matrix and $P_N$ is the process noise (which prevents the smoothed variance from being set to zero).

The registration process contains two items, azimuth bias ($\Delta Az$) and range bias ($\Delta R$). The process is time invariant and is described by the following matrixes:

$$Z = \begin{bmatrix} \Delta Az \\ \Delta R \end{bmatrix}$$

$$M = \begin{bmatrix} 1 & 0 \\ 0 & 1 \end{bmatrix}$$

$$\phi = \begin{bmatrix} 1 & 0 \\ 0 & 1 \end{bmatrix}$$

$$Q = \begin{bmatrix} VarAz^M & 0 \\ 0 & VarRg^M \end{bmatrix}$$

At time n, when new azimuth and range bias estimates ($\Delta Az_n^M$, $\Delta Rg_n^M$) are reported, the smoothing recursive process is repeated. The variances $VarAz^M$ $VarRg^M$ are derived from the initial estimated bias error. They are calculated from the radar estimated bias error reduced by the number of successful calculation $N_{Loop}$ in each master slave loop tests. The number of tracks K, used in each calculation group is preferably set to 4.

$$VarAz^M = \frac{AzSTD_{Master}^2 + AzSTD_{Slave}^2}{K * N_{Loop}}$$

$$VarRg^M = \frac{RgSTD_{Master}^2 + RgSTD_{Slave}^2}{K * N_{Loop}}$$

where AzSTD and RgSTD are the standard deviations of the variations in azimuth and range, respectively. The predicted variances at time n are equal to the smoothed variances at time n−1.

$$VarAz_n^P = VarAz_{n-1}^S$$

$$VarRg_n^P = VarRg_{n-1}^S$$

The elements of the weighting coefficient S at time n are determined to be:

$$S_{Azn} = \frac{VarAz_n^P}{VarAz^M + VarAz_n^P}$$

$$S_{Rgn} = \frac{VarRg_n^P}{VarRg^M + VarRg_n^P}$$

The new smoothed bias estimates at time n are:

$$Z_n^S = \begin{bmatrix} Az_n^S \\ Rg_n^S \end{bmatrix} = \begin{bmatrix} Az_{n-1}^S + S_{Azn}(Az_n^M - Az_{n-1}^S) \\ Rg_{n-1}^S + S_{Rgn}(Rg_n^M - Rg_{n-1}^S) \end{bmatrix}$$

and the variance of the estimate is given by the equations:

$$VarAz_n^S = (1-S_{azn})VarAz_n^P$$

$$VarRg_n^S = (1-S_{azn})VarRg_n^P$$

The new predicted position and variances for the n+1 test is assigned according to the equations:

$$Z_{n+1}^P = Z_n^S$$

$$P_{n+1}^P = P_n^S$$

The Kalman filter described above provides satisfactory performance, but it is only one method of smoothing which could be used. Other methods of smoothing the output can be used without departing from the scope of the invention.

While several illustrative embodiments of the invention have been shown and described, numerous variations and alternate embodiments, including eliminating one or more of the steps or elements described herein, will occur to those skilled in the art. Such variations and alternate embodiments are contemplated, and can be made without departing from the spirit and scope of the invention as defined in the appended claims.

I claim:

1. A method for determining an initially unknown bias for more accurately registering a multiple-radar system having at least two radars which track common targets, wherein for each target said radars each report track data, derived from azimuth and range measurements of at least one of the N common targets, the method comprising the steps of:

identifying track data from the multiple-radar system corresponding to the one of the common targets;

forming state vectors from said track data, said state vectors including both directional position and directional velocity components;

calculating a statistical distance D between state vectors corresponding to the one of the common targets; and determining a measurement bias which if applied to correct said track data, optimizes a function of said statistical distance D.

2. The method of claim 1, wherein said measurement bias comprises azimuthal bias.

3. The method of claim 2, wherein said measurement bias further comprises range bias.

4. The method of 3, wherein said function of D is determined by the step of:

averaging N statistical distances D over N track data pairs, to obtain an average value for the statistical distance D.

5. The method of claim 4 where said statistical distance D is normalized in at least one coefficient by dividing the corresponding distance coefficient, in said vector space, by an associated variance.

6. A method for determining an initially unknown bias for more accurately registering a multiple radar system having at least two radars which track N common targets, wherein for each target said radars each report track data, derived from azimuth and range measurements of the common target, the method comprising the steps of:

(a) acquiring first and second track data from first and second radars respectively, said first and second track data together comprising a track pair, each said track data representing a target's position and velocity components at a known time;

(b) expressing said first and second track data as respective first and second state vectors both in an (1+m) dimensional vector space, each said state vector having (i) L independent coefficients proportional to L components of target position, and (ii) m independent coefficients proportional to m components of target velocity;

(c) compensating said second state vector to account for an azimuthal bias, based on an estimated azimuthal bias parameter, to obtain an adjusted second state vector; and (d) determining a value of said estimated azimuthal bias parameter which minimizes a function of a normalized distance D, where D is defined as the distance between said first and second state vectors in said vector space.

7. The method of claim 6, further comprising the steps of:

(e) further compensating said adjusted second vector to account for a range bias, based on an estimated range bias parameter, to obtain a further adjusted second vector; and (f) determining the value of said estimated range bias parameter which minimizes the normalized distance D with respect to said estimated range bias parameter.

8. The method of claim 7, further comprising the steps of:

performing N iterations of steps (a) through (c), to obtain N vector pairs of first and second vectors, derived from N track pairs from N common targets; and wherein the function minimized in step (d) is an average over N of the square of D, with D calculated for each vector pair.

9. The method of claim 8, wherein said step (b) of expressing said track data as state vectors is accomplished by the steps of:

for each track pair, dividing each position component by the sum of corresponding first and second track data position component variances to obtain a normalized state vector coefficient corresponding to said position component, and for each track pair, dividing each velocity component by the sum of corresponding first and second track data velocity component variances to obtain a normalized state vector coefficient corresponding to said velocity component;

thereby expressing said track data as vectors normalized with respect to variance.

10. The method of claim 9, wherein said track pairs in step (b) are represented in radar referenced coordinates.

11. The method of claim 10, wherein said track data are represented in three position components and three velocity components and said vector space is consequently six dimensional.

12. The method of claim 6, further comprising the step of:
before step (b), defining as first data that track data acquired from the radar which is nearest the target, and as second track data that track data acquired from the radar farther from the target.

13. The method of claim 12, further comprising the step:
reiterating the steps (a) through (f) at discrete time intervals, and computing a weighted average of said estimated azimuthal bias based on its values calculated at different times.

14. The method of claim 13, wherein said weighted average is computed by using a Kalman estimator.

* * * * *